June 23, 1959  E. C. ELSNER  2,891,490
CARGO RAIL TIE-DOWN
Filed Feb. 28, 1955
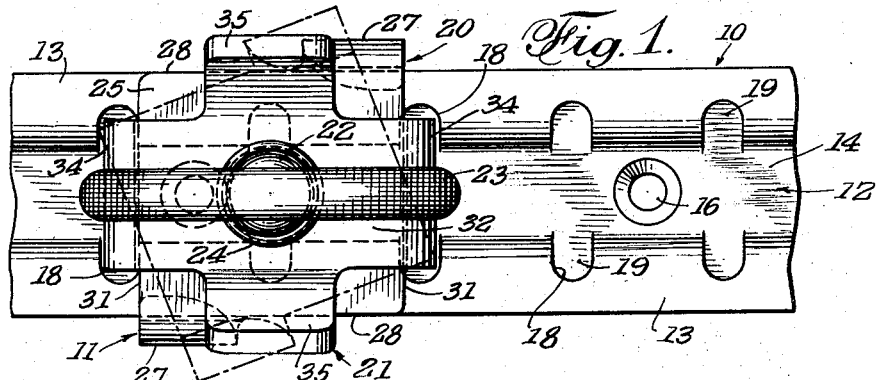
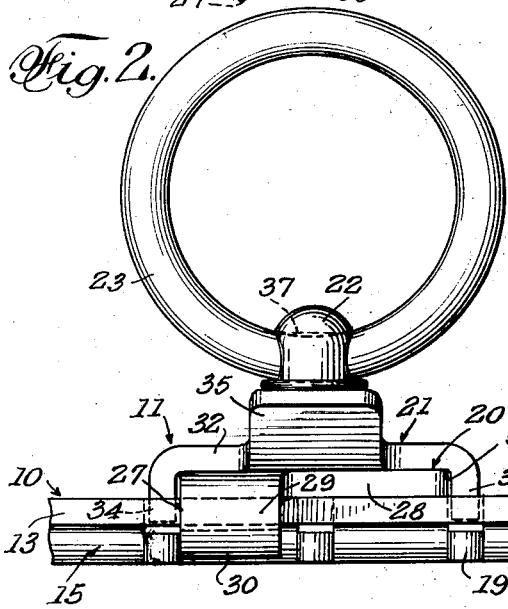
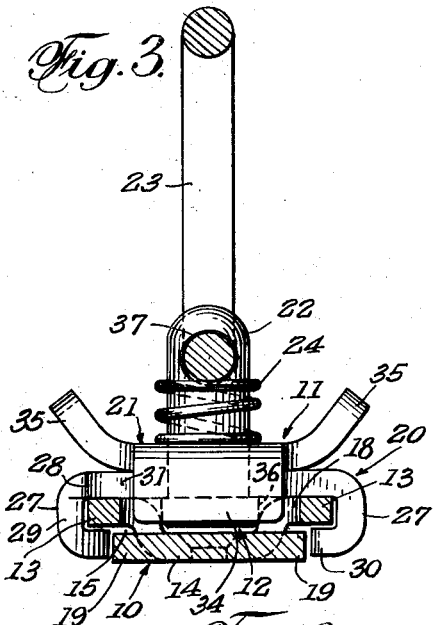
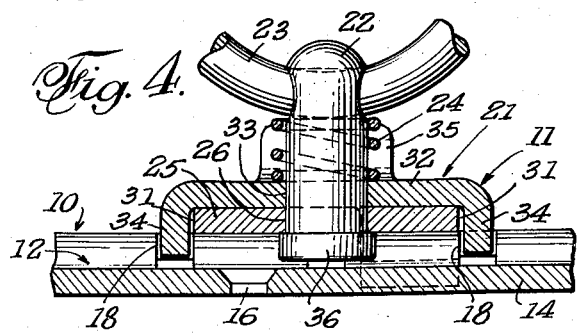
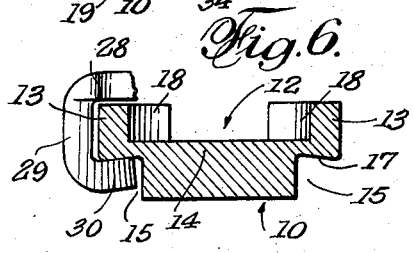
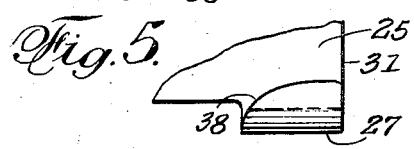
INVENTOR.
EDWIN C. ELSNER
BY
ATTORNEY

United States Patent Office 2,891,490
Patented June 23, 1959

2,891,490

CARGO RAIL TIE-DOWN

Edwin C. Elsner, Glendale, Calif., assignor, by mesne assignments to Aeroquip Corporation, Jackson, Mich., a corporation of Michigan Application February 28, 1955, Serial No. 490,828

4 Claims. (Cl. 105—369)

This invention relates to devices for securing or tying down cargo in vehicles to obviate accidental loosening and release of such cargo. More particularly, the invention deals with a tie-down that embodies a fixed rail along which a tie-down unit is adapted to be adjustably positioned.

An object of the invention is to provide a tie-down unit that is releasably connected to a cargo rail for ready adjustment along the rail.

Another object of the invention is to provide a tie-down unit that is adapted for universal rotational adjustment relative to the rail on which mounted, thereby, enabling effective tie-down of cargo in different positions relative to the rail.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Fig. 1 is a plan view showing the present cargo rail tie-down.

Fig. 2 is a side-elevational view thereof.

Fig. 3 is a cross-sectional view taken through the center of the tie-down unit.

Fig. 4 is a longitudinal sectional view taken on a plane transverse to the plane of section of Fig. 3.

Fig. 5 is a fragmentary bottom plan view showing a detail of construction.

Fig. 6 is a fragmentary cross-sectional view showing a modified form of rail.

The cargo rail tie-down that is illustrated comprises, generally, a rail 10 and a quick-release tie-down unit 11 connected to said rail and adapted to serve as a connector for the end of a cargo-holding strap or the like. It will be understood that rail 10 may be fastened to a floor, ceiling, bulkhead or other similar place and, therefore, be fixed and capable of withstanding strong forces imposed on unit 11.

The rail 10 comprises an elongated sheet metal member that is preferably formed with a longitudinal outwardly facing channel 12 that is defined between opposite flanges 13. The channel 12 has a bottom wall 14 that is offset with respect to flanges 13 to define opposite recesses 15. It will be understood that by the use of flat head screws or bolts in holes 16, the rail may be fixedly secured to a floor, ceiling, bulkhead, or similar surface and that such surface forms one side of the recesses 15.

A shown in Figs. 1 to 4, the rail 10 may be advantageously made of steel and die-formed to provide the rail with the above-described features. As shown in Fig. 6, the rail may, if desired, be made as an aluminum extrusion having the same features. It will be noted that the face 17 of each recess 15 is formed to have a transverse slope that is inward and upward from the outer edge of each flange 13. While not shown, a similar sloping face may be provided in the steel rail.

Both forms of rail shown are provided with uniformly and longitudinally spaced recesses 18 arranged on either side of channel 12 as opposed pairs, the bottoms of said recesses being coplanar with the bottom of said channel. In the steel form of the rail, said recesses 18 are formed by shearing and downwardly displacing portions 19 and so flattening said portions that they form lateral extensions of channel wall 14 and serve to increase the transverse size of the base of the rail and, therefore, its stability. In the form of Fig. 6, said recesses 18 are shown as milled into the flanges 13.

The tie-down unit 11 comprises, generally, a retaining member 20, a locking member 21, a swivel stud 22 on which said members 20 and 21 are centered, a hook, strap or rope receiving ring 23 carried by said stud, and resilient means 24 around the stud to releasably retain the assembly of the unit 11 with rail 10. The stud and ring are preferably formed of steel or comparably strong metal. The members 20 and 21 are shown as formed of sheet steel although the same may be cast or otherwise formed of steel or other strong metal alloys.

The retaining member 20 is shown as having a flat plate 25 that is substantially as wide as the rail 10 and has a length that approximately is the same as the distance between two pairs of recesses 18. Depending on the longitudinal spacing of said recesses, the length of plate 25 will be the same as the space between adjacent pairs of recesses, or, as shown, the same as the space between alternate pairs. Said plate 25 has a central hole 26 through which stud 22 extends.

Said retaining member 20 further comprises a pair of opposite hooks 27 that are integrally formed on the opposite edges 28 of plate 25 and at diagonally opposite corners of said plate, as shown best in Fig. 1. Each said hook is provided with a part 29 that extends at right angles from plate 25 outside of the outer edge of flange 13 and with a hook part 30 that resides in recess 15 and, therefore, in hooking engagement with the rail flange. As shown in Fig. 6, said hook parts 30 may be provided with a face conforming with the transverse angle of recess face 17.

The other two edges 31 of the plate 25 substantially coincide with the edges of two pairs of recesses 18 that are nearest each other, (see Fig. 1).

The locking member 21 is shown as having a flat plate 32 that has a central hole 33 for stud 22 and, at its ends, is provided with flanges 34 that are directed into the recesses 18 with which the edges 31 of retainer member 20 coincides. Said flanges 34 are formed to loosely fit into said recesses and, in so doing, are partially coextensive with the mentioned edges 31 (see Figs. 1, 2 and 4). Thus, with both members 20 and 21 on stud 22, said stud centered on channel 12, and flanges 34 and recesses 18, member 21 is held against rotation by the walls of recesses 18 and retaining member 20 is held against rotation by locking member 21. Consequently, hooks 27 retain engagement with rail flanges 13.

The locking member 21 is provided with finger-gripping extensions 35 that extend oppositely from plate 32 at right angles to flange 34. Said extensions 35 are so bent as to facilitate grasping by the fingers for the purpose of withdrawing flanges 34 from recesses 18.

The stud 22 is provided with a head 36 that so fits channel 12 as to center the tie-down unit on said channel, said head serving to guide the tie-down along the rail to a desired position, the flanges 34 being withdrawn from recesses 18 by pull on the finger-gripping extensions above-mentioned.

Said stud extends beyond locking member 21 and is provided with the ring 23 as in a transverse aperture 37 in said extension of the stud. Since the stud is freely revoluble relative to members 20 and 21, the same, together with ring 23, constitutes a 360° swivel that can turn to any position without affecting the position of the members 20 and 21.

The resilient means 24 is shown as a coil spring around the stud between the member 21 and the ring 23, said spring acting against member 21 in one direction and stud 22 in the opposite direction to press members 20 and 21 toward each other.

With the tie-down unit 11 assembled onto rail 10, as shown, any force, exerting a pull on ring 23, is transmitted to the rail through the hooks 27. Since stud 22 can freely swivel, the force can be applied from any angular direction from the center of said stud. When shifting of unit 11 along the rail is desired, it is only necessary to grasp finger extensions 35, pull member 11 upward against the light force of spring 24 to withdraw the flanges 34 from recesses 18, and slide the unit to its new position where release of member 11 will re-engage flanges 34 with two other pairs of recesses 18.

If removal of a unit 11 is desired, the member 21 is pulled as above and, when flanges 34 are clear of grooves 18, said member is turned, on the center of stud 22, in a direction to swing hooks 27 laterally outward of flanges 13 of the rail 10. This turned position is shown by the dot-dash lines of Fig. 1 and reveals that unit 11 may now be lifted away from the rail.

If the length of member 20 is proportionally greater than the width of rail 10 the hook parts 30 of hooks 27 will readily clear the outer edges of the rail flanges 13. In the form shown, this clearance is facilitated by relieving said parts 30, as at 38 (Fig. 5). Mounting of a unit 11 on rail 10 is accomplished by the reverse of the operation above described.

While the foregoing has illustrated and described what are now contemplated to be the best modes of carrying out the invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. A cargo anchoring device comprising a rail having a central longitudinal channel and opposite outwardly turned longitudinal flanges defining the sides of said channel, said flanges having a series of opposed transversely arranged locating recesses therein, and a cargo tie-down mechanism capable of attachment and release along said rail, said tie-down mechanism including a tie-down ring, a stud depending therefrom into said longitudinal channel, a manually operated retaining member pivoted on said stud having diagonally disposed, inwardly turned, depending hook members on opposite sides of the retaining member capable of clamped engagement with or release from the outer edges of said longitudinal flanges by rotation, a locking member mounted on said stud overlying the retaining member, and having recess engaging portions depending therefrom and adapted for optional positioning on said rail by engagement in or release from the locating recesses, the recess engaging portions lying closely adjacent the edges of said retaining member when said recess engaging portions are in recess engaging position, whereby the retaining member is prevented from rotating, and a spring mounted on said stud and normally biasing the recess engaging portions of said locking member into said recesses.

2. A cargo anchoring device comprising a rail having a central longitudinal channel and opposite outwardly turned longitudinal flanges defining the sides of said channel, said flanges having a series of transversely arranged locating recesses extending laterally from the channel, an da cargo tie-down mechanism capable of attachment and release along said rail, said tie-down mechanism including a tie-down ring, a pivoting stud depending therefrom into said longitudinal channel, a manually operated retaining member pivoted on said stud having diagonally disposed, inwardly turned, depending hook members on opposite sides of the retaining members capable of clamped engagement with or release from the outer edges of said longitudinal flanges by rotation, and a locking member resiliently mounted on the stud overlying the retaining member, said locking member having recess engaging portions depending therefrom and adapted for optional positioning on said rail by engagement in or release from the locating recesses, the recess engaging portions lying closely adjacent the edges of said retaining member when said recess engaging portions are in recess engaging position, whereby the retaining member is prevented from rotating, and a spring mounted on said stud and normally biasing the recess engaging portions of said locking member into said recesses.

3. A cargo anchoring device comprising a rail having a central longitudinal channel and opposite outwardly turned longitudinal flanges defining the sides of said channel, said flanges having a series of transversely arranged locating recesses extending laterally from the channel, and a cargo tie-down mechanism capable of attachment and release along said rail, said tie-down mechanism including a tie-down ring, a pivoting stud depending therefrom into said longitudinal channel, a head portion on said stud forming a guide and seating member therein, a manually operated retaining member pivoted on said stud having diagonally disposed, inwardly turned, depending hook members on opposite sides of the retaining member capable of clamped engagement with or release from the outer edges of said longitudinal flanges by rotation, a locking member resiliently mounted on said stud and immediately overlying said retaining member, said locking member having laterally disposed depending portions thereof engageable with and release from said locating recesses, said laterally disposed depending portions lying closely adjacent the edges of said retaining member when said laterally disposed depending portions are engaged with said locating recesses, whereby the retaining member is prevented from rotating, and a spring mounted on said stud and normally biasing said locking member on said retaining member and normally biasing the laterally disposed depending portions of said locking member into engagement with said locating recesses.

4. A cargo anchoring device comprising a rail having a central longitudinal channel and opposite outwardly turned longitudinal flanges defining the sides of said channel, said flanges having a series of transversely arranged, locating recesses extending laterally from the channel, and a cargo tie-down mechanism capable of attachment and release along said rail, said tie-down mechanism including a tie-down ring, a pivoting stud depending therefrom into said longitudinal channel, a head portion on said stud forming a guide and seating member therein, a manually operated retaining member pivoted on said stud having diagonally disposed, inwardly turned, depending hook members on opposite sides of the retaining member capable of clamped engagement with or release from the outer edges of said longitudinal flanges by rotation, whereby said hook members have their clamping surfaces conforming to the transverse angle of said longitudinal rail flanges, a locking member resiliently mounted on said stud and immediately overlying said retaining member, said locking member having laterally disposed depending portions thereof engageable with and release from said locating recesses, said laterally disposed depending portions lying closely adjacent the edges of said retaining member when said laterally disposed depending portions are engaged with said locating recesses, whereby the retaining member is prevented from rotating, and a spring mounted on said stud and normally biasing said locking member on said retaining member and normally biasing the laterally disposed dependent portions of said locking member into engagement with said locating recesses.

References Cited in the file of this patent

UNITED STATES PATENTS

| | | |
|---|---|---|
| 2,439,907 | Poglein | Apr. 20, 1948 |
| 2,688,289 | Sterling | Sept. 7, 1954 |
| 2,688,504 | Parker | Sept. 7, 1954 |
| 2,736,272 | Elsner | Feb. 28, 1956 |